US012659558B1

(12) United States Patent
van Hoytema

(10) Patent No.: US 12,659,558 B1
(45) Date of Patent: Jun. 16, 2026

(54) SYSTEM AND METHOD FOR GENERATING A SINGLE IMAGE FROM A CAPTURED SPLIT IMAGE

(71) Applicant: Furious People, Beverly Hills, CA (US)

(72) Inventor: Hoyte van Hoytema, Los Angeles, CA (US)

(73) Assignee: Furious People, Beverly Hills, CA (US)

( * ) Notice: Subject to any disclaimer, the term of this patent is extended or adjusted under 35 U.S.C. 154(b) by 0 days.

(21) Appl. No.: 18/804,957

(22) Filed: Aug. 14, 2024

Related U.S. Application Data

(60) Provisional application No. 63/533,254, filed on Aug. 17, 2023.

(51) Int. Cl.
| | |
|---|---|
| *H04N 23/11* | (2023.01) |
| *G02B 27/10* | (2006.01) |
| *H04N 23/16* | (2023.01) |
| *H04N 23/55* | (2023.01) |
| *H04N 23/56* | (2023.01) |
| *H04N 23/90* | (2023.01) |

(52) U.S. Cl.
CPC ........... *H04N 23/16* (2023.01); *G02B 27/106* (2013.01); *H04N 23/11* (2023.01); *H04N 23/55* (2023.01); *H04N 23/56* (2023.01); *H04N 23/90* (2023.01)

(58) Field of Classification Search
CPC ........ H04N 23/16; H04N 23/56; H04N 23/90; H04N 23/11; H04N 23/55; G02B 27/106
See application file for complete search history.

(56) References Cited

U.S. PATENT DOCUMENTS

| | | | | |
|---|---|---|---|---|
| 2023/0079693 A1* | 3/2023 | Urklinski | ............... | G06T 7/292 |
| | | | | 374/121 |
| 2023/0095041 A1* | 3/2023 | Wang | ................... | G06V 10/774 |
| | | | | 382/159 |
| 2024/0015382 A1* | 1/2024 | Schueler | .............. | H04N 23/617 |

* cited by examiner

*Primary Examiner* — Jonathan R Messmore
(74) *Attorney, Agent, or Firm* — Amster, Rothstein & Ebenstein LLP

(57) ABSTRACT

A system and method for altering an image or video stream of images using different types of information captured from the image(s) and combining the different types of information for generation of a single composite image.

6 Claims, 5 Drawing Sheets

501 —  X — 502

503

SYSTEM AND METHOD FOR GENERATING A SINGLE IMAGE FROM A CAPTURED SPLIT IMAGE

RELATED APPLICATION

This application claim priority to and the benefit of U.S. Provisional Application No. 63/533,254, filed Aug. 17, 2023 and entitled SYSTEM AND METHOD FOR GENERATING A SINGLE IMAGE FROM A CAPTURED SPLIT IMAGE, the contents of which are incorporated herein by reference.

FIELD OF THE INVENTION

The present disclosure generally relates to multiple imaging systems, and more specifically to systems and method for capturing image information associated with an object and/or scene using at least two different image sensors with differing parameters to generate two separate images that can be combined into a single unique image.

BACKGROUND OF THE INVENTION

In video production, conventional techniques are used to manipulate specific areas in an image or a stream of video images. These techniques include chroma keying and roto-scoping.

Chroma key compositing, or chroma keying, is a visual-effects and post-production technique for compositing (layering) two or more images or video streams together based on color hues (chroma range). A color range in the foreground footage is made transparent, allowing separately filmed background footage or a static image to be inserted into the scene. Depending on the color of the background, this technique may also be referred to as blue screen or green screen. In the case of green screen, for example, software may be used to isolate the specific green area so that changes can be implemented or elements can be added to those areas.

Chroma keying has a number of technological issues that often hinder its ability to be used effectively in creating realistic content. For example, even though the process of using green screens may appear straightforward, getting it right can be notoriously tricky. One of the biggest issues is ensuring that the lighting is even because otherwise, it will not key in properly during editing. Also, because the process is complex, the time taken to edit the video can be significantly longer, which can drive up production costs. In addition, because of the difficulty of the technique, the effect may not seem natural because of mismatches in the color temperature, the perspective, and even the scale.

Rotoscoping is a technique used for more complex additions or changes to an image or video stream, and involves frame by frame painting. Edges and differentiations are marked out and selected manually, by going through a sequence frame by frame. Although smart software exists that simplifies this task, it is still a hugely costly and labor intensive venture.

Further, there is currently no efficient technique for generating a nighttime scene using a full color image other than CGI, or extensive rotoscoping in combination with CGI.

Accordingly, there is a need for an improved system and method for altering an image or video stream of images using different types of information captured from the image(s) and combining the different types of information for generation of a single composite image.

SUMMARY OF INVENTION

A method according to an exemplary embodiment of the present invention comprises: capturing a light beam reflected off an object using a lens mounted to a beam splitter component; splitting the light beam into a first component and a second component using the beam splitter; sending the first component of the light beam to a first camera; sending the second component of the light beam to a second camera; generating, using the first camera, full color image data associated with a full color image of the object formed using the first component of the light beam; generating, using the second camera, infrared image data associated with an infrared image of the object formed using the second component of the light beam; overlaying the full color image data with the infrared image data to generate overlayed image data; merging the overlayed image data; and generating an image of the scene based on the overlayed image data, wherein the full color image and the infrared image are captured in daylight and the generated image is a nighttime image of the object.

In an exemplary embodiment, the infrared image is a black and white infrared image.

A system according to an exemplary embodiment of the present invention comprises: (A) a beam splitter component comprising: a lens mount configured for attachment to a camera lens; and beam splitter component configured to split a beam of light from a scene captured through the camera lens into a first component and a second component; (B) a first camera unit operatively connected to the beam splitter component and configured to generate full cover image data corresponding to a full cover image of the scene captured based on the first component of the beam of light at a first point in time; (C) a second camera unit operatively connected to the beam splitter component and configured to generate infrared image data corresponding to an infrared image of the scene captured based on the second component of the beam of light at the first point in time; and (D) an image processing unit comprising: one or more processors; and non-transitory computer-readable memory operatively connected to the one or more processors and stored thereon machine-readable instructions that, when executed by the one or more processors, cause the one or more processors to perform a method comprising: (i) overlaying the full color image data with the infrared image data to generate overlayed image data; (ii) merging the overlayed image data; and (iii) generating an image of the scene based on the overlayed image data, wherein the full color image and the infrared image of the scene are captured in daylight and the generated image is a nighttime image of the scene.

BRIEF DESCRIPTION OF THE DRAWINGS

Exemplary embodiments of the present invention will be described with reference to the accompanying figures, wherein.

DETAILED DESCRIPTIONS OF THE INVENTION

As used throughout the specification and claims, the term "beam splitter" means a partially reflecting optical element that can both transmit and reflect incident light, including but not limited to a partially reflecting mirror, a pellicle, or an optical coating or layer, to name a few.

As used throughout the specification and claims, the term "optical detector" means a detector, image sensor, CMOS sensor, CCD sensor, linear detector array, film, celluloid, or any other optically sensitive medium or device.

Technological challenges exist in the conventional techniques of manipulating images and video images. For example, in the conventional green screen technique, there are often mismatches in color temperature, perspective and scale, which results in less than satisfactory results. Other techniques, such as rotoscoping, are labor intensive and therefore drive up production costs and delays. In exemplary embodiments, the present invention addresses these technological challenges by providing a system and method that directly captures two types of images of a scene or object, such as, for example, full color images and infrared images, using a beam splitter, and combines the images into a single image. The two types of image data generated based on the different types of captured images allows a user to manipulate an image of the scene or object to achieve desired effects, such as, for example, an enhanced nighttime scene generated based on images of the scene captured in daylight. Accordingly, the inventive technique is more efficient and effective as compared to conventional techniques, including green screen and rotoscoping techniques.

Figure 1:
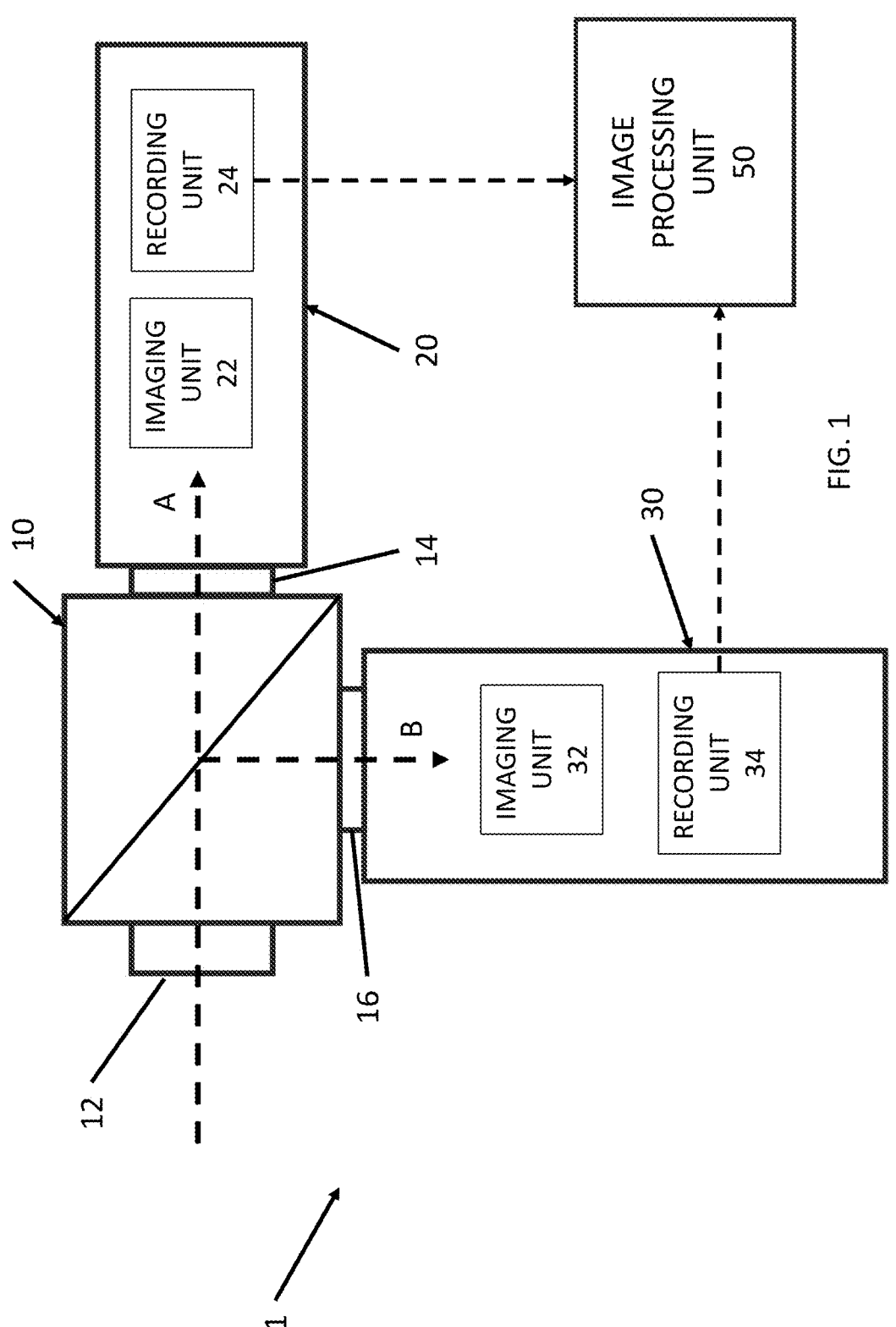
FIG. 1 is a block diagram of an imaging system according to an exemplary embodiment of the present invention.

FIG. 1 shows an imaging system, generally designated by reference number 1, according to an exemplary embodiment of the present invention. The imaging system 1 includes a beam splitter component 10, a first camera unit 20, a second camera unit 30 and an image processing unit 50. The beam splitter component 10 includes a lens mount 12 disposed at an image incident side of the splitter component 10. The lens mount 12 is configured for connection to a lens, such as, for example, a Super 35 lens commonly used in cinematography. The beam splitter component 10 further includes a first camera mount 14 disposed on a side of the beam splitter component 10 opposite to the lens mount side, and a second camera mount 16 disposed on a third side of the beam splitter component 10 between the first and second sides. The first camera unit 20 is operatively connected to the first camera mount 14 of the beam splitter component 10 and the second camera unit 30 is operatively connected to the second camera mount 16 of the beam splitter component 10.

In exemplary embodiments, each of the camera units 20, 30 may include components, such as, for example, imaging units 22, 32, recording units 24, 34, and various accessories. The imaging units 22, 32 may include optical detectors that convert light entering the camera unit 24, 34 into electrical signals and image processors that process the information from the sensor to create image files. The recording units 24, 34 record the image files processed at high speed by the image processor onto media. In this regard, the image files may be recorded in an unaltered format (e.g., RAW image data format) or in a variety of compressed or uncompressed file formats, such as, for example, MP4, MOV, WMV, AVI, AVCHD, FLV, F4V, SWF, MKV, WEBM and HTML5, to name a few.

Each camera unit 20, 30 may include accessories, such as, for example, a battery expansion unit for prolonged filming and a monitor to check images, to name just two.

Figure 2:
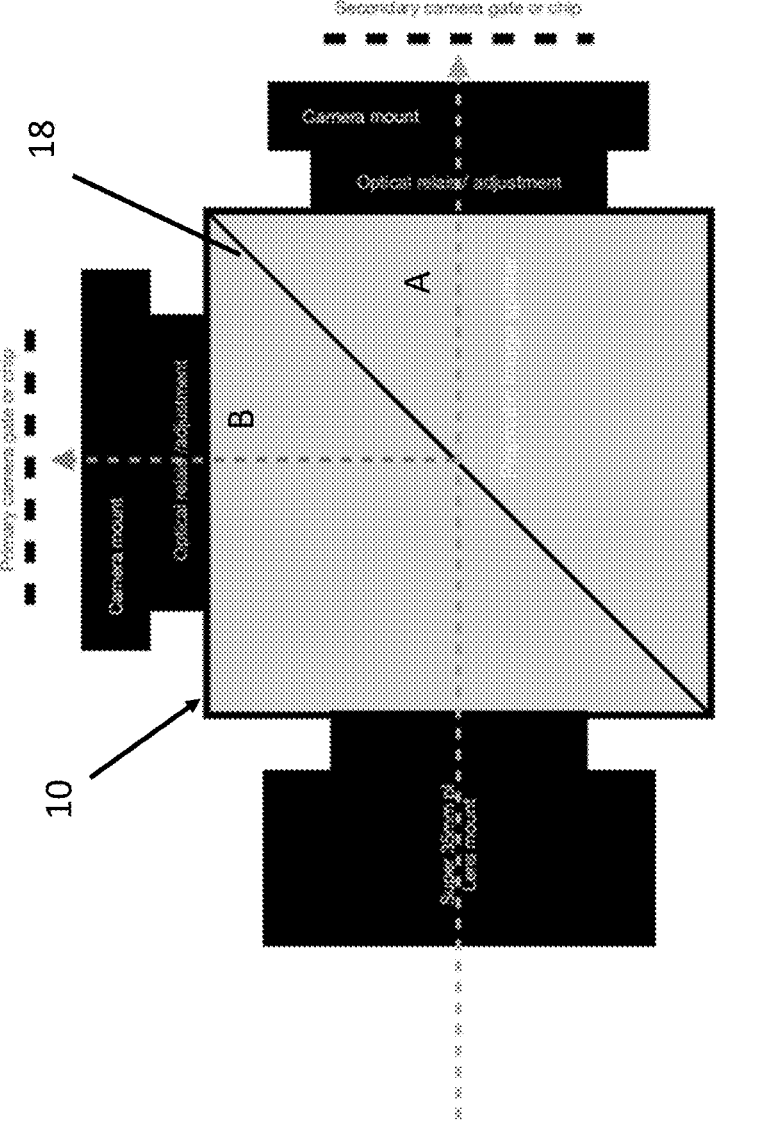
FIG. 2 is a block diagram of a beam splitter component according to an exemplary embodiment of the present invention.

As shown in FIG. 2, the beam splitter component 10 includes a beam splitter 18 configured to reflect an incident beam of light in two directions, including a first direction (indicated by arrow A) incident to the imaging unit 22 of the first camera unit 20 and a second direction (indicated by arrow B) incident to the imaging unit 32 of the second camera unit 30.

In an exemplary embodiment, the imaging unit 32 of the second camera unit 30 is configured to capture infrared images, and preferably near-infrared images. In this regard, the optical detector of the imaging unit 32 may include a filter that blocks visible light but allows for capture of infrared image information. The imaging unit 22 of the first camera unit 20 meanwhile is configured to allow for capture of images in the visible light spectrum.

The image processing unit 50 is configured to collect full color image data generated by the first camera unit 20 and infrared image data generated by the second camera unit 30 and generate an image based on the full color image data and the infrared image data. In exemplary embodiments, the image processing unit 50 may be a separate component within the system 1, or may be integrated with one or more of the other components, including the beam splitter component 10, the first camera unit 20 and the second camera unit 30.

Figure 3:
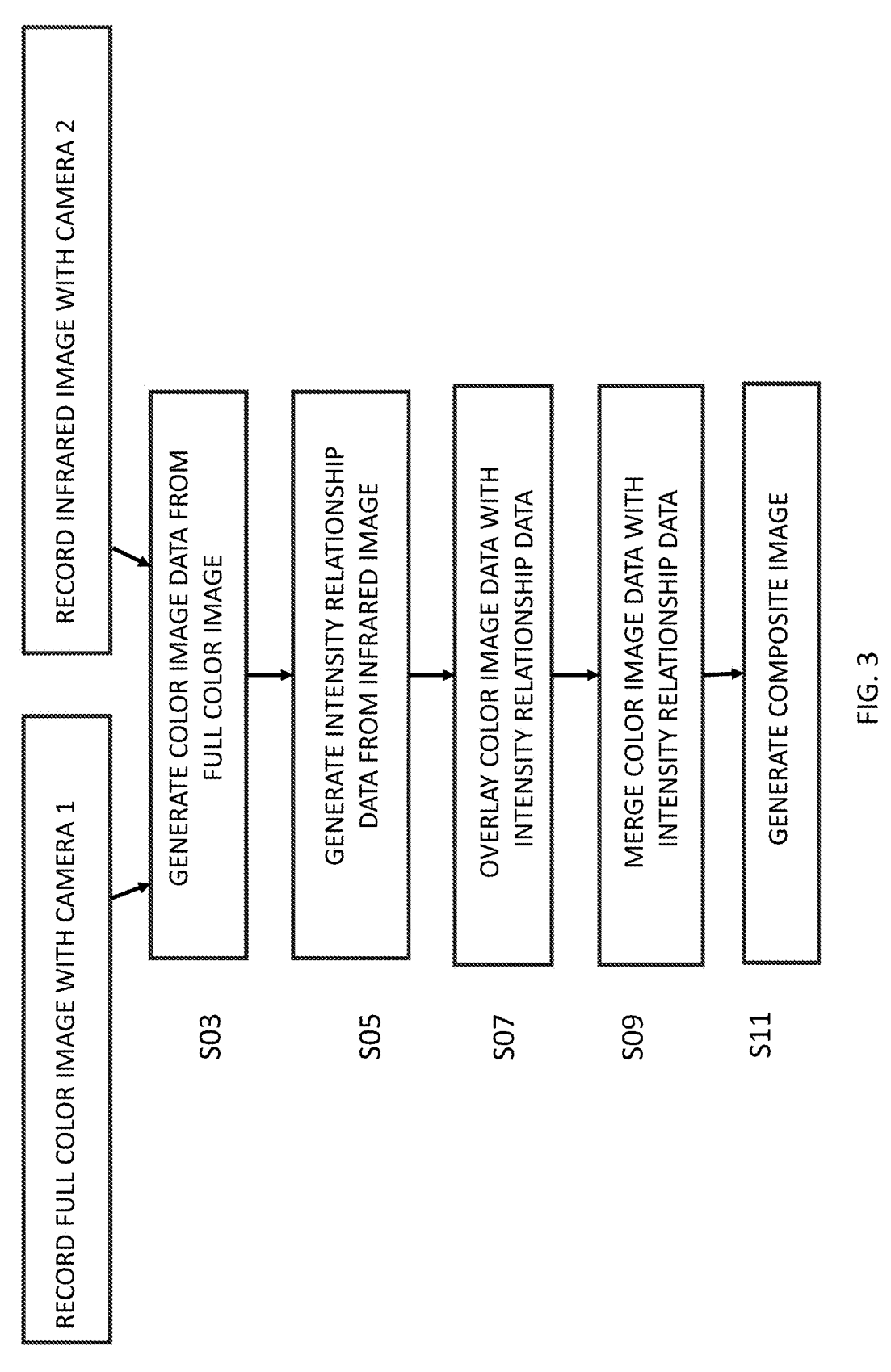
FIG. 3 is a flow chart showing a method for generating a composite image based on a full color image of a scene captured by the first camera unit and an infrared image of the same scene captured by the second camera unit according to an exemplary embodiment of the present invention.
Figure 4:
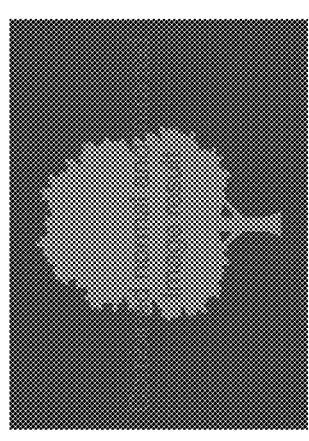
FIG. 4 is a representative diagram showing a process for generating a composite image according to an exemplary embodiment of the present invention.
Figure 4:
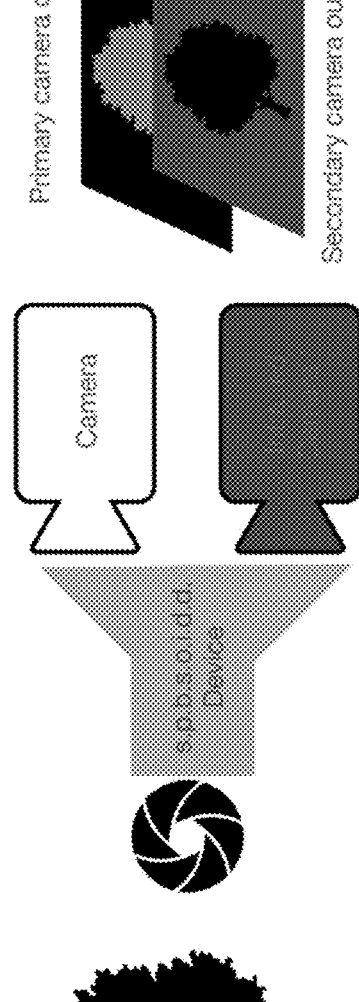
Figure 4:

FIG. 3 is a flowchart showing a method for generating a composite image based on a full color image of a scene captured by the first camera unit 20 and an infrared image of the same scene captured by the second camera unit 30. In step S01 of the process, full color image of the scene is captured by the first camera unit 20 and the infrared image of the same scene is captured by the second camera unit 30. In this step, the two cameras shoot the exact same scene geometrically aligned at the same time, without any parallax. In an exemplary embodiment, the infrared image is a black and white infrared image. FIG. 4 shows an example of the process in which the subject of the captured image is a tree.

In step S03, color image data is generated from the full color image captured by the first camera unit 20. In an exemplary embodiment, the color image data includes all the information needed to determine the parameters of the full color scene, including, for example, colors included in the scene and grain structure, to name just two.

In step S05, intensity relationship data is generated from the infrared image captured by the second camera unit 30. The intensity relationship data may be associated with information on intensity and balance of light within the scene. In the example shown in FIG. 4, output from the first camera unit 20 includes a full color image the tree and output from the second camera unit 30 includes a corresponding infrared image of the tree.

In step S07, the intensity relationship data and the color image data are overlayed on one another. In this step, the two sets of data may be aligned so that a specific location within the image corresponds with a first data point associated with the intensity relationship data at that location and a second data point associated with the color image data at that location. Thus, the overlayed image data is made up pairs of data points with each pair including corresponding color image data and corresponding intensity relationship data.

In step S09, the overlayed relationship data and color image data are merged. In this regard, each of the pairs of data points generated in step S07 are combined into a single data point that includes information pertaining to both color image data and intensity relationship data.

In step S11, the merged data generated in step S09 is used to generate a composite image. In the example shown in FIG. 4, the resulting tree image is made up of the merged full color image of the tree and the corresponding infrared image of the tree.

Figure 5:
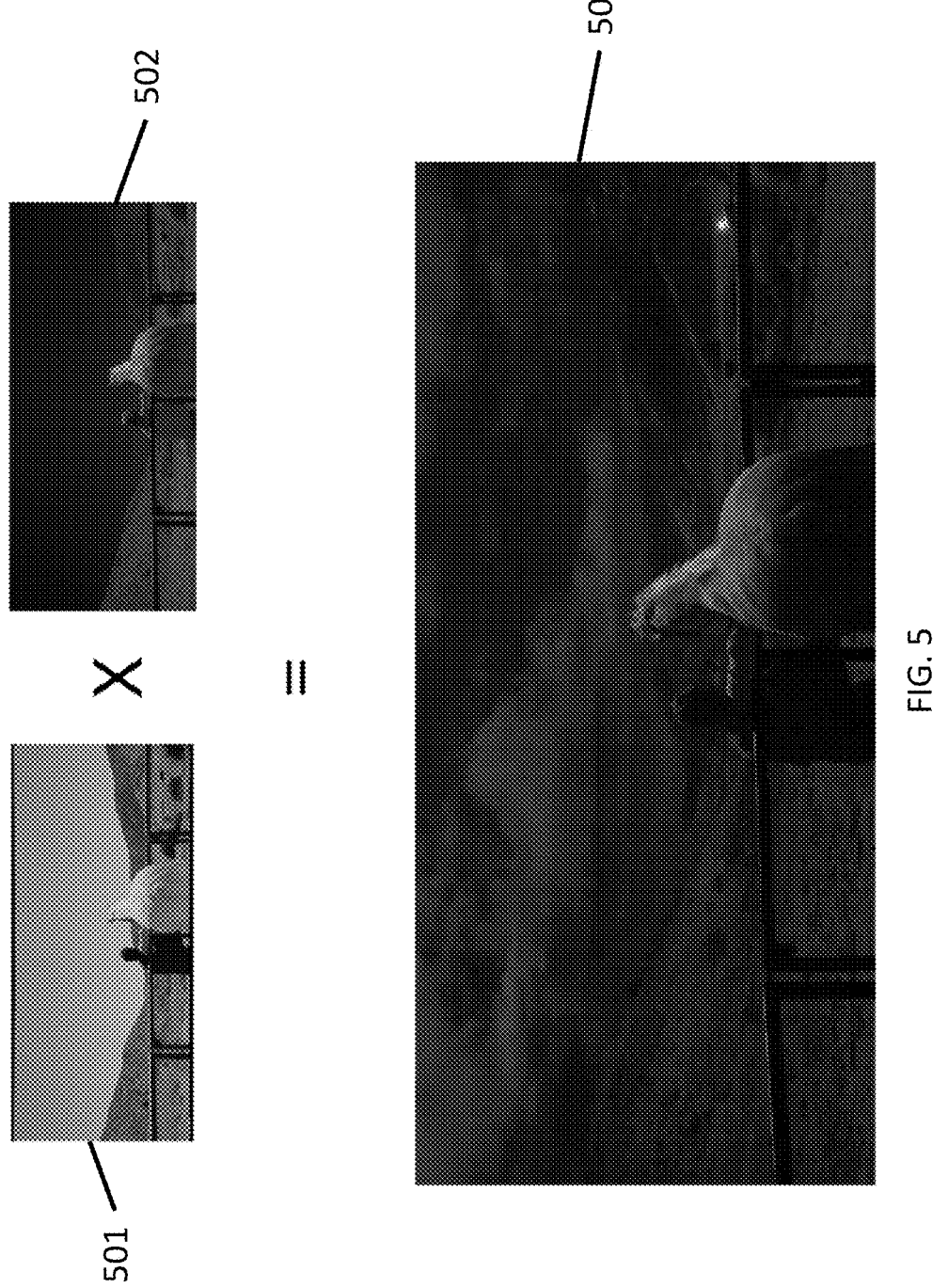
FIG. 5 show images of full color and infrared scenes that are combined to form a composite image of the scene according to an exemplary embodiment of the present invention.

As shown in FIG. 5, in exemplary embodiments, the process shown in FIG. 3 may be used to generate an enhanced night scene that previously could only have been achieved by either utilizing CGI, or extensive rotoscoping in combination with CGI. The enhanced night scene may be made up of a color image shot during the daytime, in which the skies are dark, vegetation bright, lesser deep shadows, softer highlights, etc. In this regard, the full color image 501 and the infrared image 502 may be recorded at the same time during a bright sunlit day, with the infrared image captured in black and white. In the black and white infrared image, the sky shows up darker in relationship to objects within the scene, such as, for example, vegetation, and there is no color solution from spill from clouds, sky and bounce. Infrared is a very narrow bandwidth of light, not dissimilar to how our eyes perceive the sunlight bouncing off the moon's surface. Effectively, the infrared provides a very credible night "look" over images shot during day. However, these images are black and white, as the information gathered by the infrared is of extremely narrow bandwidth. Shooting the black and white image simultaneously with the color image provides one unique set of information from the color camera and one unique set of information from the infrared. The color provides all the information of present wavelengths of light, while the infrared provides the information about the intensity and required balance for this specific usage, resulting in the composite image 503 (the cloudscape was added after generation of the composite image).

In exemplary embodiments, the processes described herein may be implemented using one or more computer components, including one or more computer modules that include one or more processors and communication portals (e.g., for sending and/or receiving data). The one or more processors may include one or more processing devices, such as, for example, a microprocessor, a microcontroller, an application-specific integrated circuit (ASIC), a field programmable gate array (FPGA) or other type of processing circuitry, as well as portions or combinations of such circuitry elements. The computer modules can also include non-transitory computer-readable memory with one or more databases and data stored thereon. The memory may comprise electronic memories such as random access memory (RAM), read-only memory (ROM), or other types of memory, in any combination. Data stored on the memory can include data such as, for example, color image data, infrared image data, intensity relationship data, overlay image data, merged color and infrared image data and final image data, to name a few. One or more software modules may be stored in the memory and running or configured to run on the one or more processors.

In an exemplary embodiment, a scene or one or more objects within a scene may be illuminated with infrared light, thus making them readable to an infrared camera. This may allow for use of a chroma key process, without requiring a green screen, for instance.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

The invention claimed is:

1. A method comprising:
   capturing a light beam reflected off an object using a lens mounted to a beam splitter component;
   splitting the light beam into a first component and a second component using the beam splitter;
   sending the first component of the light beam to a first camera;
   sending the second component of the light beam to a second camera;
   generating, using the first camera, full color image data associated with all locations within a full color image of a scene that contains the object as formed using the first component of the light beam;
   generating, using the second camera, infrared image data associated with all locations within an infrared image of the scene that contains the object as formed using the second component of the light beam;
   overlaying the full color image data with the infrared image data to generate overlayed image data;
   merging the overlayed image data; and
   generating an image of the scene based on the overlayed image data,
   wherein the full color image and the infrared image are captured in daylight and the generated image is a nighttime image of the scene that contains the object.

2. The method of claim 1, wherein the infrared image is a black and white infrared image.

3. The method of claim 1, further comprising illuminating the object with infrared light.

4. A system comprising:
   (A) a beam splitter component comprising:
      a lens mount configured for attachment to a camera lens; and
      beam splitter component configured to split a beam of light from a scene captured through the camera lens into a first component and a second component
   (B) a first camera unit operatively connected to the beam splitter component and configured to generate full cover image data corresponding to all locations within a full cover image of the scene captured based on the first component of the beam of light at a first point in time;
   (C) a second camera unit operatively connected to the beam splitter component and configured to generate infrared image data corresponding to all locations within an infrared image of the scene captured based on the second component of the beam of light at the first point in time; and
   (D) an image processing unit comprising:
      one or more processors; and
      non-transitory computer-readable memory operatively connected to the one or more processors and stored thereon machine-readable instructions that, when executed by the one or more processors, cause the one or more processors to perform a method comprising:
         (i) overlaying the full color image data with the infrared image data to generate overlayed image data;
         (ii) merging the overlayed image data; and (iii) generating an image of the scene based on the overlayed image data, wherein the full color image and the infrared image of the scene are captured in daylight and the generated image is a nighttime image of the scene.

5. The system of claim 4, wherein the infrared image is a black and white infrared image.

6. The system of claim 4, wherein the method further comprises illuminating the scene with infrared light.

\* \* \* \* \*